United States Patent [19]

Chaplin et al.

[11] 4,153,815

[45] May 8, 1979

[54] ACTIVE ATTENUATION OF RECURRING SOUNDS

[75] Inventors: George B. B. Chaplin; Roderick A. Smith, both of Colchester; Robert G. Bearcroft, Ipswich, all of England

[73] Assignee: Sound Attenuators Limited, Colchester, England

[21] Appl. No.: 793,275

[22] Filed: May 3, 1977

[30] Foreign Application Priority Data

May 13, 1976 [GB] United Kingdom .............. 19717/76

[51] Int. Cl.² .......................... H04B 15/00; G10L 1/00

[52] U.S. Cl. .................................... 179/1 P; 179/1 SD

[58] Field of Search .................. 179/1 P, 1 SA, 1 SC, 179/1 SD

[56] References Cited

U.S. PATENT DOCUMENTS

| | | | |
|---|---|---|---|
| 3,071,752 | 1/1963 | Strasberg | 340/5 R |
| 3,936,606 | 2/1976 | Wanke | 179/1 P |
| 4,025,724 | 4/1977 | Davidson | 179/1 P |
| 4,044,203 | 8/1977 | Swinbanks | 179/1 P |

*Primary Examiner*—William C. Cooper
*Assistant Examiner*—E. S. Kemeny
*Attorney, Agent, or Firm*—Michael J. Striker

[57] ABSTRACT

This invention concerns a method of, and apparatus for, reducing the ambient noise level at a location in the vicinity of a source of recurring noise. In its preferred embodiments the invention involves generating a series of cancelling noise signals which are exactly synchronized with the bursts of recurring noise from the source and adapting the cancelling signals in the series on the basis of the success achieved in nulling the noise from the source at the location.

5 Claims, 13 Drawing Figures

Figure 1:
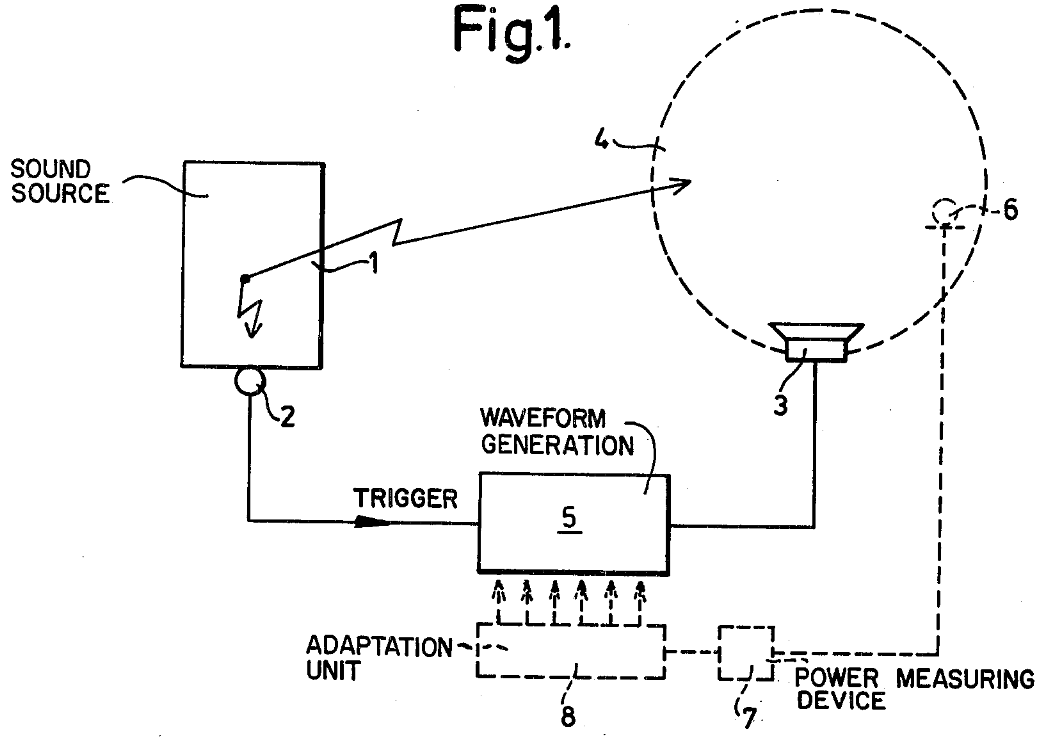

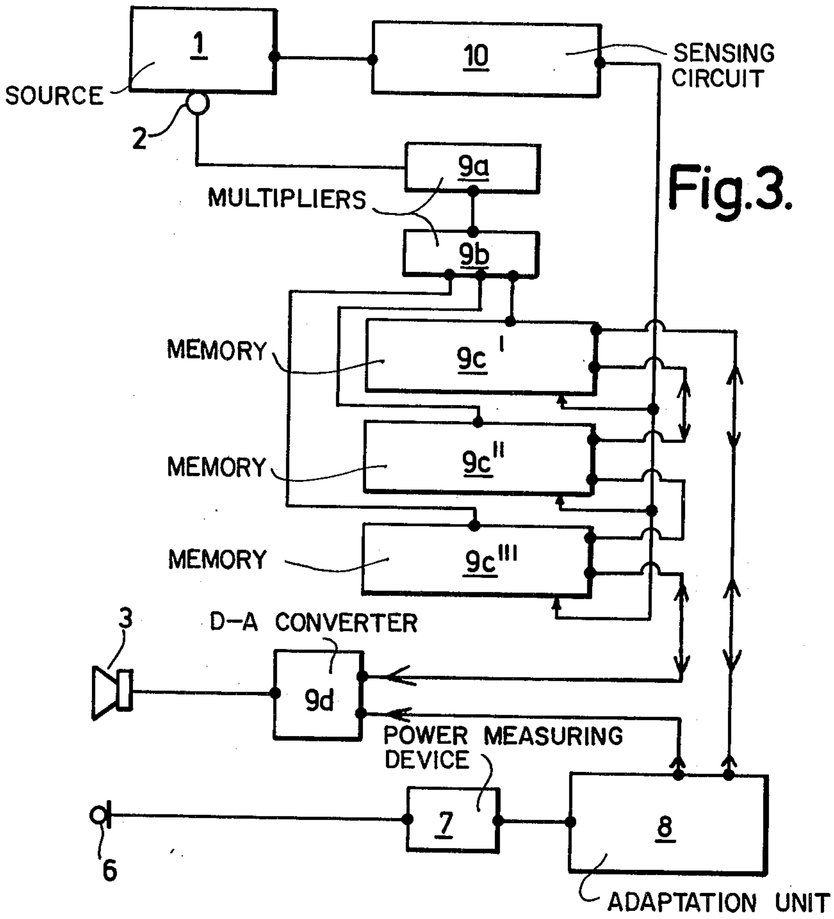
Fig.3.
Fig.6.
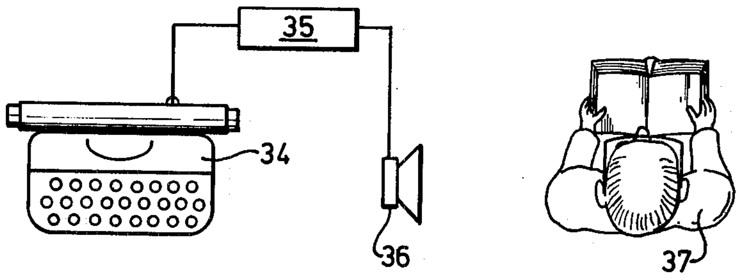

t=0 t=3 t=30

ACTIVE ATTENUATION OF RECURRING SOUNDS

This invention relates to a method of or apparatus for the reduction of unwanted vibrations received at a selected location from a source (point or distributed). The invention concerns application of the technique broadly known as "active attenuation" in which the unwanted vibration is at least partially cancelled at the said location by a nulling vibration specially generated (e.g. by a waveform generator) and fed into the location.

This invention is concerned with methods of active attenuation where some anticipatory information as to the vibration to be attenuated is available and thus has particular reference to the reduction of vibrations from a source of recurrig sound (such as an internal combustion engine).

In the specification of U.S. Pat. No. 3,071,752 there is described apparatus for reducing the disturbing effect of recurring noise from a machine on sonar equipment which uses a recording of the recurring noise driven by the machine to generate cancellation signals which can be fed into the sonar equipment to at least partly null the background noise from the machine. The recording can be on a magnetic tape or disc powered by a drive shaft of the machine and the specification suggests that if the characteristic sound of the machine is different in different speed ranges, a unique recording for each speed range can be made and means provided to switch recordings as the machine speeds up or slow down.

The arrangement described in this specification has significant drawbacks. It would be very difficult to endure accurate synchronisation of the recording and the machine under widely different operating conditions and the quality of the recording will deteriorate with time. Further the noise output of the machine will be affected by many parameters requiring a vast number of different recordings (and means to select which one is required at any given time) if all possible changes and conditions are to be accounted for.

Yet again there must be a physical link between the noise-generating machine and the rest of the equipment and such a link may not be possible or at least not desirable.

This invention relates to an improved method of reducing, from a source of recurring noise, the amplitude of unwanted vibrations at a selected location. The sole information required from the source is a triggering signal.

Because the nature of the primary wave generated by the source is similar on each occasion of its generation information as to when the source is generating the primary wave is enough to enable a nulling secondary wave to be generated and fed to the selected location.

The present invention relates to a method of reducing the amplitude of vibrations received at a selected location from a source of recurring noise, which involves feeding to said location a specially generated secondary vibration which at least partially nulls the vibrations from the source at the said location and using a triggering signal is derived from the source to synchronise the generation of the secondary vibration with that of the vibration to be cancelled.

For working such a method it would be necessary to use a sound generating system which had been selected (or in some way preset) to tranmit a nulling waveform which will coact with the sound of (say) one explosion from a diesel exhaust or one impact of a pneumatic road drill at the chosen location spaced from the source of the sound. The waveform generator is "fired" to generate a cancelling waveform each time a trigger signal is received from the source from which the burst of primary sound is being emitted. In accordance with this invention the shape of the cancelling waveform is derived initially by a successive series of approximations as described more fully hereafter. Where the primary sound bursts are to an appreciable extent identical each time, once the nulling system has been "adapted" to the primary sound as received in the selected location little or no further adaptation of the nulling waveform will be required.

Suitably, however, the generation for the secondary vibration is arranged so that its output can be modified on the basis of success achieved in cancelling the unwanted sound vibrations from the source. One method of implementing this is to divide the cancelling waveform into a number (e.g. 32) of "time slots", and to modify the amplitude within each time slot until the correct cancelling waveform is arrived at. Each time slot is modified in turn, and on each occasion the criterion for success is that the total residual noise power, as measured by a microphone at the cancelling point, should be reduced. It may be necessary to proceed sequentially through the time slots more than once to achieve maximum cancellation. Using such an adaptive technique it is immaterial what form the secondary vibration takes initially, since each time a burst of unwanted vibration is generated by the source a modified waveform can be tried and if the system is programmed to seek out the most successful secondary vibration it is only a matter of time before the correct secondary vibration is found to effect the desired degree of cancellation. The adaptive technique may employ a microphone located at the said location to sense the quality of the contemporary nulling action by the noise power measurement. A simple memory can be used to determine whether, following a change in the nulling waveform, the nulling action has improved.

The electrical trigger signal to synchronise the generation of the secondary vibration can be derived from a microphone disposed close to the source or, in the case where the source is rotating or reciprocating machinery, the synchronising signal may be derived from a motional transducer mounted on the machinery itself. Where the source of the vibrations to be nulled is itself an electrical transducer, a part of the signal driving that transducer can be picked off and used as the trigger signal for the purposes of the method of this invention.

Apparatus for reducing the noise received at a selected location from a source of recurring primary sound waves which operates in accordance with the method of the invention constitutes a further aspect of the invention.

Figure 2:
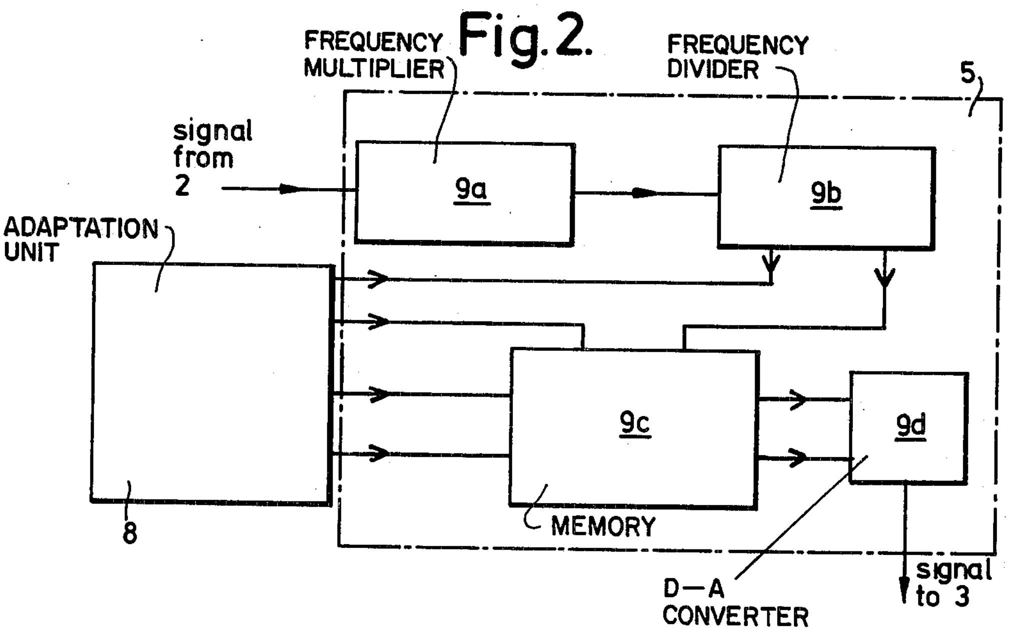
Figure 4:
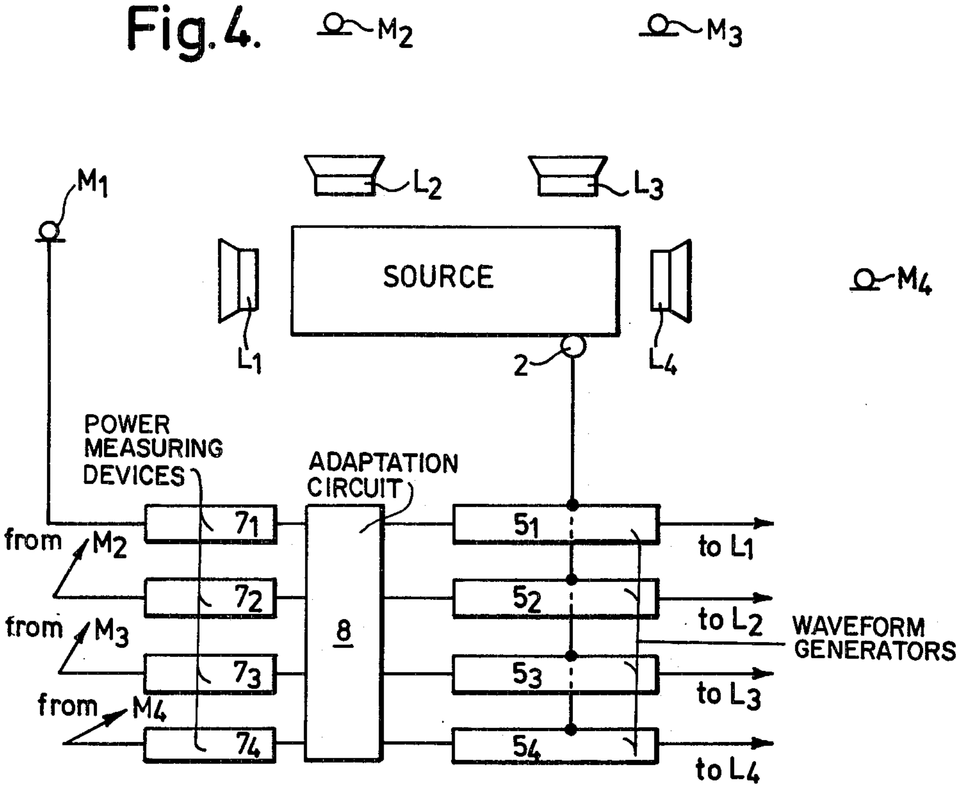
Figure 5:
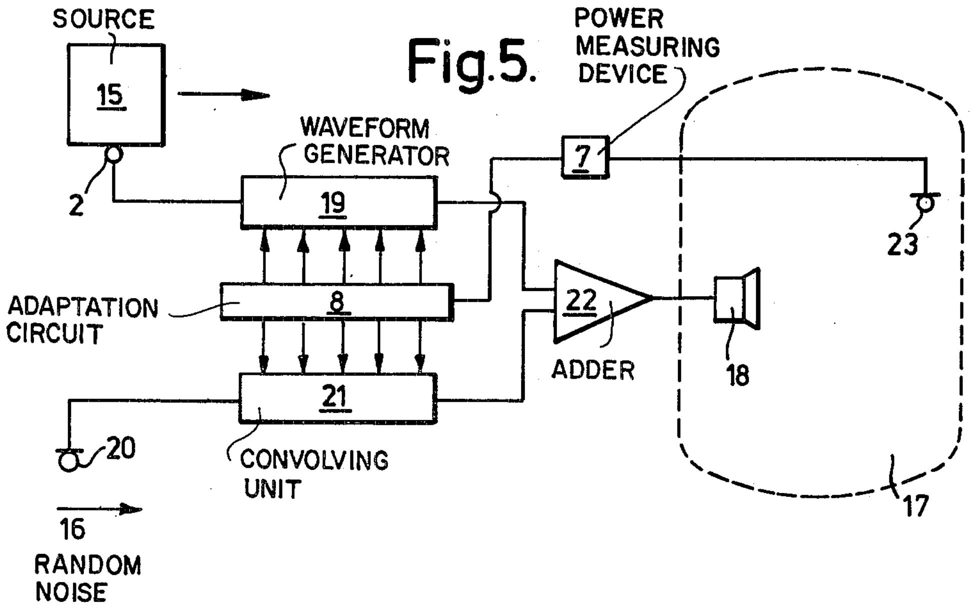
Figure 7:
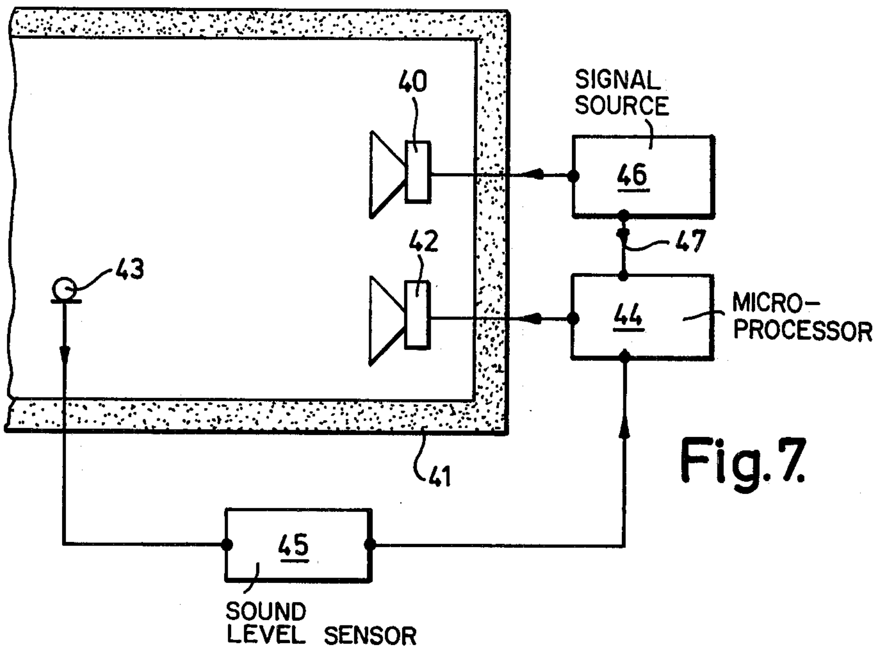
Figure 9:
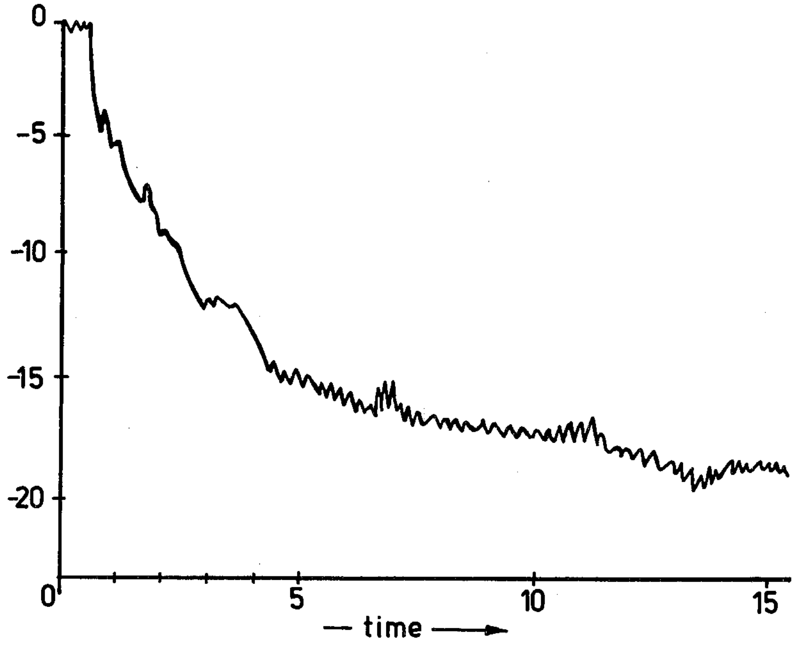
Figure 10:
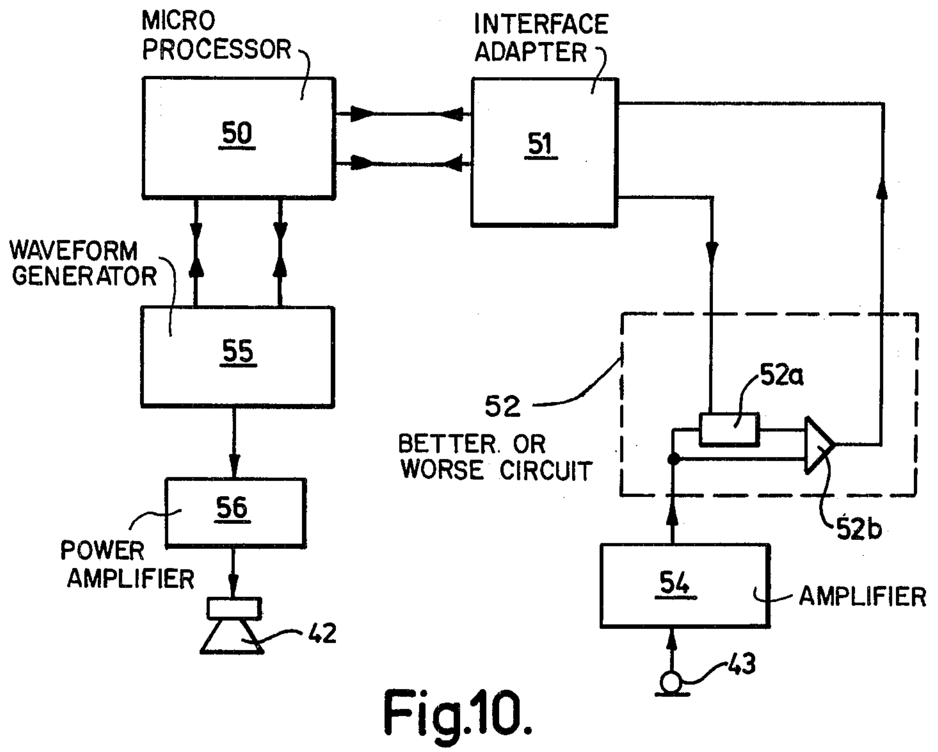
Figure 11:
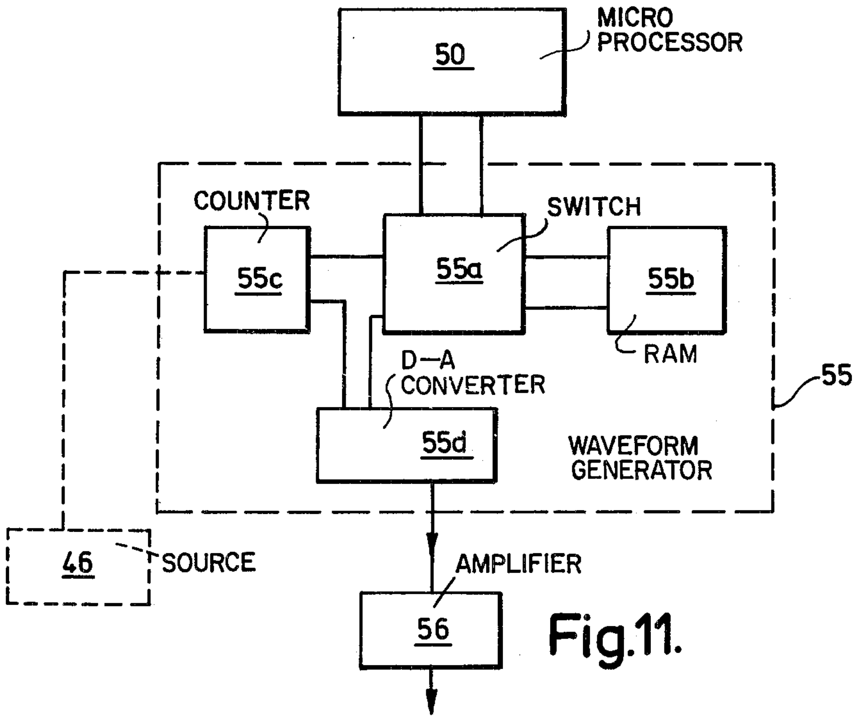

The invention will now be described by way of example, with reference to the accompanying drawings, in which:

FIG. 1 is a schematic illustration of the broad principles behind the method and apparatus of the invention, FIG. 2 is a block diagram illustrating one embodiment of waveform generator as shown in FIG. 1, FIG. 3 is an embodiment in accordance with the invention suitable for a particular characteristic noise, FIG. 4 shows the details of a preferred arrangement for cancellation of noise from a distributed repetitive source such as an engine, FIG. 5 shows an arrangement for nulling the sound entering a location from two different sources, one a source of repetitive sound, and the other source of purely random sound, FIG. 6 is a schematic representation of one embodiment of the invention used to provide a quiet area adjacent to a typewriter, FIG. 7 shows a practical set-up used to demonstrate the method of the invention, FIGS. 8a, 8b, 8c and 9 show experimental results obtained with the set-up of FIG. 7, and FIGS. 10 and 11 show details of the set-up of FIG. 7 in greater detail.

Referring to FIG. 1, a source 1 of recurring sound is provided with an electrical transducer 2 which generates a trigger signal that synchronises with the bursts of sound energy from the source. A loudspeaker 3 located in a protected area 4 (shown by the dashed line) is energised from a waveform generator 5 to which the trigger signal is fed. Within the area 4 the sound from the loudspeaker 3 (at least to some extent) nulls the sound reaching that area from the source 1. The integers 2, 3 and 5 would be sufficient to achieve an acceptable reduction of sound in the area 4, if the waveform generator 5 could generate a suitable cancelling signal.

In accordance with the invention further integers shown dotted in FIG. 1 are employed. These are a sensing microphone 6 within the area 4 which feeds its output signal via a power measuring device 7 to the input of an adaptation unit 8 being used to modify the performance of the waveform generator 5.

One example of an application in which a simple system such as that shown in FIG. 1 could be employed, would be an area adjacent to an IC engine, the transducer 2 sensing each burst of sound from the engine (e.g. each firing stroke) and with an appropriate time-lag to allow for the sound to reach the area 4, generating a cancelling pulse of preset amplitude and waveform to at least partially null the effect of the sound on somebody within the area 4. Since to a large extent every pulse of sound from the source 1 is the same as every other pulse of sound, the signal necessary to null it in the area 4 is the same in each case and once the generator 5 is delivering the correct nulling sound all that matters is the synchronisation of the primary and nulling sounds within the area 4.

The transducer 2 can take many forms such as, for example, a pressure sensitive electrical transducer on the exhaust of the engine, a vibration-sensitive electrical transducer on the casing of the engine, motion-sensing means on some moving part of the engine or an electrical signal derived directly from the ignition or fuel injection systems.

The system shown in FIG. 1, by including the integers 6, 7 and 8, does allow for the performance of the equipment to be self-improving, the feedback loop defined by the integers 6, 7 and 8 acting to minimise the power output from the unit 7. The full system shown in FIG. 1 can be used for circumstances where although the same sound recurs time after time, the amplitude and/or waveform of the sound in each burst can be expected to vary in the long term.

By way of further explanation, integer 7 converts the residual waveform produced by microphone 6 into a sound power measurement. One well known method of achieving this is to full wave rectify the waveform and then integrate it over, for example, one firing cycle of the engine. Integer 8 can include a microprocessor, which makes the decision as to whether a particular modification is desirable or undesirable, based on minimizing the residual noise power for integer 7.

In order to do this, it must temporarily store both the modification which was previously made, and the corresponding residual power measurement, so that the latter can be compared with the new residual power value. This storage may be of an analog nature, such as a "sample and hold" circuit, or it may be in the form of a digital number.

These functions can be implemented by any one of a variety of conventional computer programs. An example of a suitable algorithm is as follows.

The elements of the waveform stored in the memory are treated by the program as elements of an array, such that W(O) is the element whose digital value is converted at the start of the cancelling cycle, and W(31) is converted to analog for amplification to the speaker at the end of each cancelling cycle. The algorithm employed is:

Let n=1

1. waveform (n)=waveform (n)+1 if (Current power<last power) GOTO 1

2. waveform (n) =waveform (n)−1 if (current power<last power), GOTO 2 waveform (n)−waveform (n)−1

$$n=n+1$$

if n<last, GOTO 1.Else GOTO start.

One form of generator 5 and adaptation unit 8 which could be used in the system of FIG. 1 is illustrated in FIG. 2.

The synchronisation signal from the transducer 2 can be assumed to be at a repetitive frequency f. A frequency multiplier 9a (e.g. incorporating a phase locked loop) feeds a frequency which is an integer multiple of the frequency f to a frequency divider chain 9b which sequentially addresses locations of the memory 9c, in which the current cancelling waveform is stored. This waveform memory 9c stores a plurality of samples, one for each time slot each having a unique address in the memory 9c. The samples represent portions of a purcursor of the required waveform to be generated and are presented sequentially to a digital analogue converter 9d to generate the actual waveform to be fed to the loudspeaker 3. It is because each of the samples must be presented once per repetition of the acoustic waveform to generate the required secondary wave that the need arises for a frequency multiplier, the degree of multiplication depending on the number of samples (in a typical case 32). The samples stored in the memory 9c can be derived in a variety of different ways but since the memory is modified by the unit 8 to minimise the output from the unit 7 it is not generally too important what the starting samples are, since eventually if each burst of recurring primary sound energy is like each other burst, the correct samples will appear in the memory 9c and the pattern of samples one starts with merely affects how long it takes to get the correct cancelling signal.

The adaptation unit 8 (which can be a conventional microprocessor) can address the memory 9c (at intervals determined by the programme built into the microprocessor) to update the values stored in each section of the memory and conventional techniques can be used for this. Preferably a time delay is built into the updating mechanism to ensure that any alleged improvement is a genuine (and thus a lasting one) one before the memory is updated.

The time delay is needed to ensure that the cancelled sound used for the decision to update or not, must be the sound produced by the new trial waveform. The sound travels at a finite speed which is slow in electronic terms, so the delay ensures that the results of the modification are sensed by the pickup microphone rather than the results of a previous modification. Reflections from objects as well as the direct path must be considered when deciding on an appropriate delay, typically ten milliseconds in free space where the cancellation is close to the noise source, and as long as a few seconds in reverberent room. A reasonable delay time might be the accoustic reverberation time to decay to 20 db after a gunshot. The delay would normally be chosen to be an integer multiple of the basic repetition rate of the noise source.

FIG. 3 shows an arrangement which can be used to cancel sound which has a constant wave shape at any given repetition rate but whose repetition rate alters considerably over a short time scale and whose wave shape is affected by the repetition rate. In the arrangement shown in fIG. 3 the wave shapes for three different bands of frequencies are stored in three different memory blocks 9*c*′, 9*c*″ and 9*c*‴, and a sensing circuit 10 selects the appropriate memory location for the current freuency of operation. The waveform adjusting automaton 8 can act to adjust the wave shape in each block of memory and will be effective at any given time on the memory block corresponding to the current frequency of operation. If desired, the choice of memory from which the adaptive waveform is drawn can be based on parameters other than frequency such as the loading of an internal combustion engine, the degree of throttle opening and/or the speed depending on the nature of the sensing unit 10.

Equipment such as shown in FIG. 3 could be used to reduce the ambient sound level within the operating cab of a machine where the machine can operate in a variety of different modes with each of which a characteristic noise is associated. In such circumstances a substantial reduction in noise level is acceptable even when this is far short of 100 percent cancellation so that the adaptive technique provided by integers 6, 7 and 8 may not be necessary and if it is provided need not be of sophisticated design.

FIG. 4 schematically illustrates a situation where an extended area surrounding a source of repetitive noise needs to be protected, a plurality of sensing microphones M1-M4 being located at locations spaced apart across the protected area. A plurality of loudspeakers for generating the necessary nulling signals (L1...L4) are disposed adjacent to the source. A single trigger signal can be derived from a transducer 2 on the source and fed to all the waveform generators ($5_1...5_4$) to synchronise the generation of the nulling signals for the individual loudspeakers.

FIG. 4 shows a power sensing circuit ($7_1...7_4$) for each microphone but in practice the outputs from the power sensing circuits can be averaged to give a single residual power measurement to be used as the criterion for accepting or rejecting each modification made to each of the waveform generators ($5_1...5_4$). The different memory locations in each generator can be addressed by the microprocessor using conventional address decoding and selection techniques using the different memories in turn.

With the arrangement shown the adaptation will proceed until the total output from all the circuits $7_1...7_4$ is at a minimum.

FIG. 5 illustrates an arrangement in which noise from a repetitive source 15 and noise from a random source 16 flowing into a protected area 17 are both nulled from a single loudspeaker 18. The trigger signal from the source 15 is fed to a waveform generator 19 and the random signal from the source 16 is picked up by an upstream microphone 20 and fed to a unit 21 where it is convolved with an appropriate programme in the manner described in the specification of our copending application Ser. No. 749472. An adder 22 combines the output signals from 19 and 21 and acts as the driver for the loudspeaker 18. A sensing microphone 23 is used to modify the performance of either or both the generator 19 or the unit 21 to achieve improved cancellation.

The null the noise from a typewriter 34 (see FIG. 6), a waveform generator 35 is triggered to emit a nulling sound in the desired direction from a loudspeaker 36 whenever a key on the typewriter has been pressed. This provides a quiet zone for a reader 37. In the simplest system a single preset waveform is used for all the keys. In a somewhat more sophisticated system, the typewriter keys are classified in groups on the basis of the sound each makes, and a slightly different secondary wave is generated for each different group of keys, an arrangement, such as that shown in FIG. 3 without the integers 6, 7 and 8 being employed in this case.

However to allow for the effect of different typists, different paper, different mountings of the machine and the effects of wear and tear on the noise output of a machine an adaptive technique using a microprocessor 8 is much preferred.

In the case of producing "quiet areas" adjacent to a road drill or pile driver similar principles would apply.

EXAMPLE

The invention will be furthr described by the following Example.

A loudspeaker 40 (see FIG. 7) simulating a source of repetitive noise was installed in a room 41 which was not acoustically damped. A second loudspeaker 42 was then mounted in close proximity to the loudspeaker 40 and a microphone 43 was placed about 4 meters from the pair of loudspeakers to measure the residual, uncancelled noise. The loudspeaker 40 was driven by a source 46 and the microphone 43 fed its output to a sound level metering unit 45. A microprocessor 44 programmed to monitor the power and repetition rate (but not the waveshape) of the noise picked up by the microphone 43 was used to generate a waveform, consisting of 32 discrete samples and this waveform was applied to the loudspeaker 42 to reduce the noise power at the microphone 43 to a minimum. The microprocessor 44 initially supplied a digitally generated waveform of arbitrary shape and amplitude to the noise reducing loudspeaker 42 and was synchronised to the source 46 by a line 47. The waveform was divided into 32 time slots, and each slot was varied in turn in amplitude. If the variation of a particular time slot produced a reduction in the power output of the microphone 43, it was incorporated in the waveform but if it did not, it was rejected.

Figure 8A:
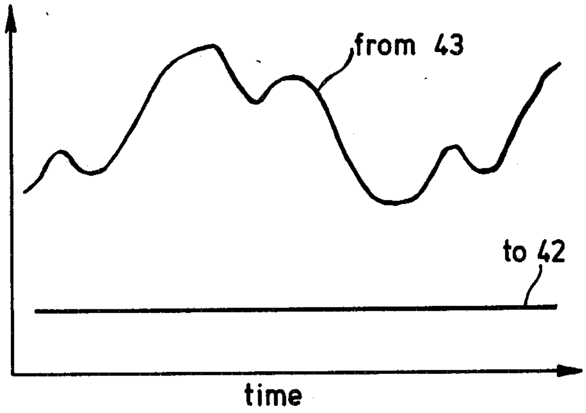
Figure 8B:
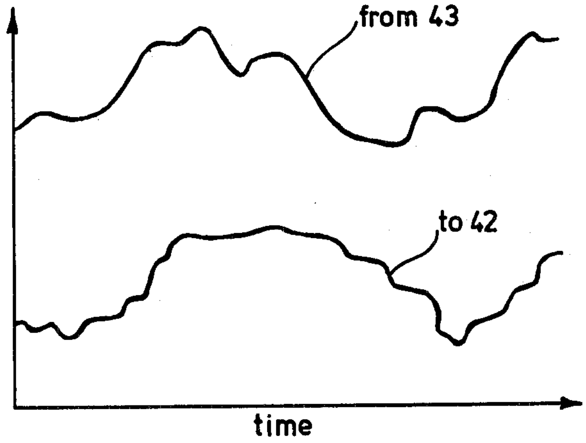
Figure 8C:
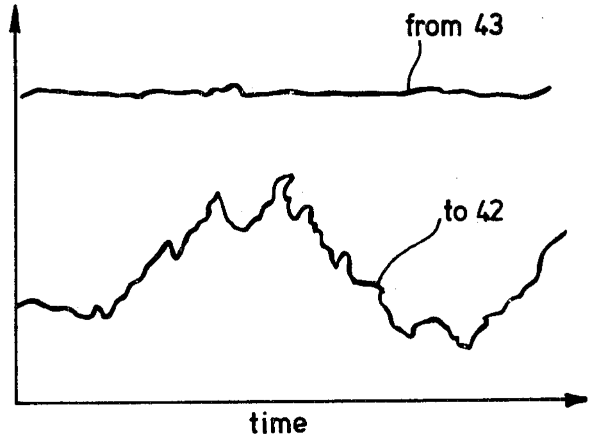

Referring to FIGS. 8*a*-8*c* the oscillograms show the output from the microphone 43 and the input to the loudspeaker 42 for three instants of time after a 65 Hz complex waveform had been applied to the noise source 40. In FIG. 8(a), at t=o, no cancellation is taking place and so the residual waveform shows the full effect of the noise source and the acoustic characteristics of the room 41 at the microphone 43. FIG. 8(*b*) shows that after 3 minutes the cancellation waveform has partially adapted itself and reduced the noise source to below half power, whilst FIG. 8(*c*) shows virtually complete cancellation after 30 minutes, leaving only a ripple due to the finite number of samples. It should be noted that the cancellation waveform of FIG. 8(*c*) differs from the residual sound waveform of FIG. 8(*a*) because the system automatically takes into account the characteristics of the transducers and the room. A plot of the residual noise power against time for the first 15 minutes is shown in FIG. 9 and from this it can be seen that a reduction in signal strength of 15dB was obtained inside five minutes.

A response time of 5 minutes is too long for many applications, but a more efficient algorithm and the storing of information relating to various operating conditions and the possible use of waveshape information in addition to power information from the microphone permit the response time to be reduced to at most a few seconds.

FIG. 10 shows how the output of the microphone 43 is used to generate the cancelling waveform fed to the loudspeaker 42. A microprocessor and random access memory 50 (types MCS 6502 and M.6810) is connected to a peripheral interface adapter 51 (type M.6820) which under control, pulses a sample line to a "better-or worse"circuit 52 which includes a sample and hold circuit 52*a* using a CD 4016 transmission gate and a CA 3130 amplifier and a comparator 52*b*. The input to the circuit 52 is from the microphone 43 via an amplifier and precision rectifier 54 constructed using conventional techniques and 741 type operational amplifiers.

The microprocessor type MCS 6502 is configured in an individualised system (functionally very similar to a base sold under the Trade Mark "KIM" by MOS Technology Inc) and has facilities for programme loading from keys or demestic audio type or teletype, a couple of kilobytes of random access storage for programme and data, and a potential of 65 kilobytes of storage. A decimal decoder-driver (type 7442) is used for address decoding and this selects device types when particular areas of memory are addressed. The unit 50 controls a waveform generator 55 that feeds the loudspeaker 42 via a power amplifier 56.

FIG. 11 shows the waveform generator 55 in greater detail. It consists of a small random access memory (part of a M 6510) 55*b* which can be connected to the unit 50 via a switch 55*a* or to a chain of type 7493 counters 55*c* and a resistive digital to analogue converter 55*d*.

When generating a waveform for the loudspeaker 42, the address for the RAM 55*b* is provided by the counters 55*c*, resulting in the presentation of the contents of successive locations in the RAM 55*b* to the digital to analogue converter 55*d* in successive time intervals.

While the processor unit 50 is modifying the shared RAM 55*b*, the RAm 55*b* is temporarily disconnected from the counters 55*c* and the converter 55*d* by the switch 55*a* and is connected to the processor unit 50 as a convertional memory. The switching function of the switch 55*a* is performed on the address bus by type 74157 gates (not shown) and on the date bus by type CD4066 gates (not shown).

The source 46 (see FIG. 7) is connected to the counters 55*c* as shown dotted in FIG. 11.

What is claimed is:

1. A method of reducing the amplitude of sound vibrations received at a selected location from a source of recurring noise, which method comprises the steps of: synchronizing by a timing signal from the source at said location a waveform generator and feeding to said location a secondary sound vibration derived from an output waveform which at least partially nulls the sound vibrations at said location; thereafter storing in a memory component part waveforms of said output waveform and sequentially combining a series of said component part waveforms to modify the output waveform by a successive series of approximations while comparing the degree of cancellation of the unwanted sound vibration from the source at the selected location, each successive approximation being made by altering at least one of the individual component parts and adapting an alternation of a component part by updating that part in the memory or rejecting that part alternation on the basis of whether or not that part alternation improved the degree of cancellation of the unwanted sound vibration.

2. A method as claimed in claim 1, in which a microphone is located at the selected location to sense the quality of the contemporary cancelling action and a microprocessor is used to determine whether, following a change in the output waveform of the generator, the cancelling action has improved.

3. A method as claimed in claim 1, in which the timing signal used to synchronize the generation of the secondary sound vibration is derived from a transducer disposed close to the source.

4. A method as claimed in claim 3, in which in the case where the source is moving machinery, the synchronizing timing signal is derived from a motional transducer mounted on the machinery itself.

5. Apparatus for reducing the noise received at a selected location from a source of recurring primary sound waves comprising a waveform generator, transducer means for deriving from the generator a secondary sound wave which at least partially nulls the primary sound wave in the said location and an electrical transducer located at or closely adjacent to the source for feeding a timing signal to the generator to trigger the generation of the secondary wave in synchronism with the generation of the primary wave, and a microphone in the said location to sense the residual noise left after interference of the primary and secondary sound waves in the said location, the generator including a memory in which are stored a plurality of electrical component signals, each representing a part of the full signal fed to the transducer means, each of said component signals being at a unique address in the memory, and a microprocessor connected to said memory and the output of said microphone to periodically modify at least some of said component signals to effect a reduction in the said residual noise.

* * * * *

UNITED STATES PATENT AND TRADEMARK OFFICE

CERTIFICATE OF CORRECTION

PATENT NO. : 4,153,815

DATED : May 8, 1979

INVENTOR(S) : Chaplin et al.

It is certified that error appears in the above-identified patent and that said Letters Patent are hereby corrected as shown below:

Claim 1, line 4, after "synchronizing" insert --,--; after "source" insert --,--; delete "at said";

line 5, delete "location";

line 7, after "waveform" insert --of the generator,--; after "which" insert --secondary sound vibration--;

line 16, change "adapting" to --adopting--;

line 17, change "alternation" to --alteration--;

line 18, change "alternation" to --alteration--;

line 19, change "alternation" to --alteration--.

Signed and Sealed this

*Tenth* Day of *March 1981*

[SEAL]

*Attest:*

RENE D. TEGTMEYER

*Attesting Officer* *Acting Commissioner of Patents and Trademarks*